Patented Oct. 26, 1926.

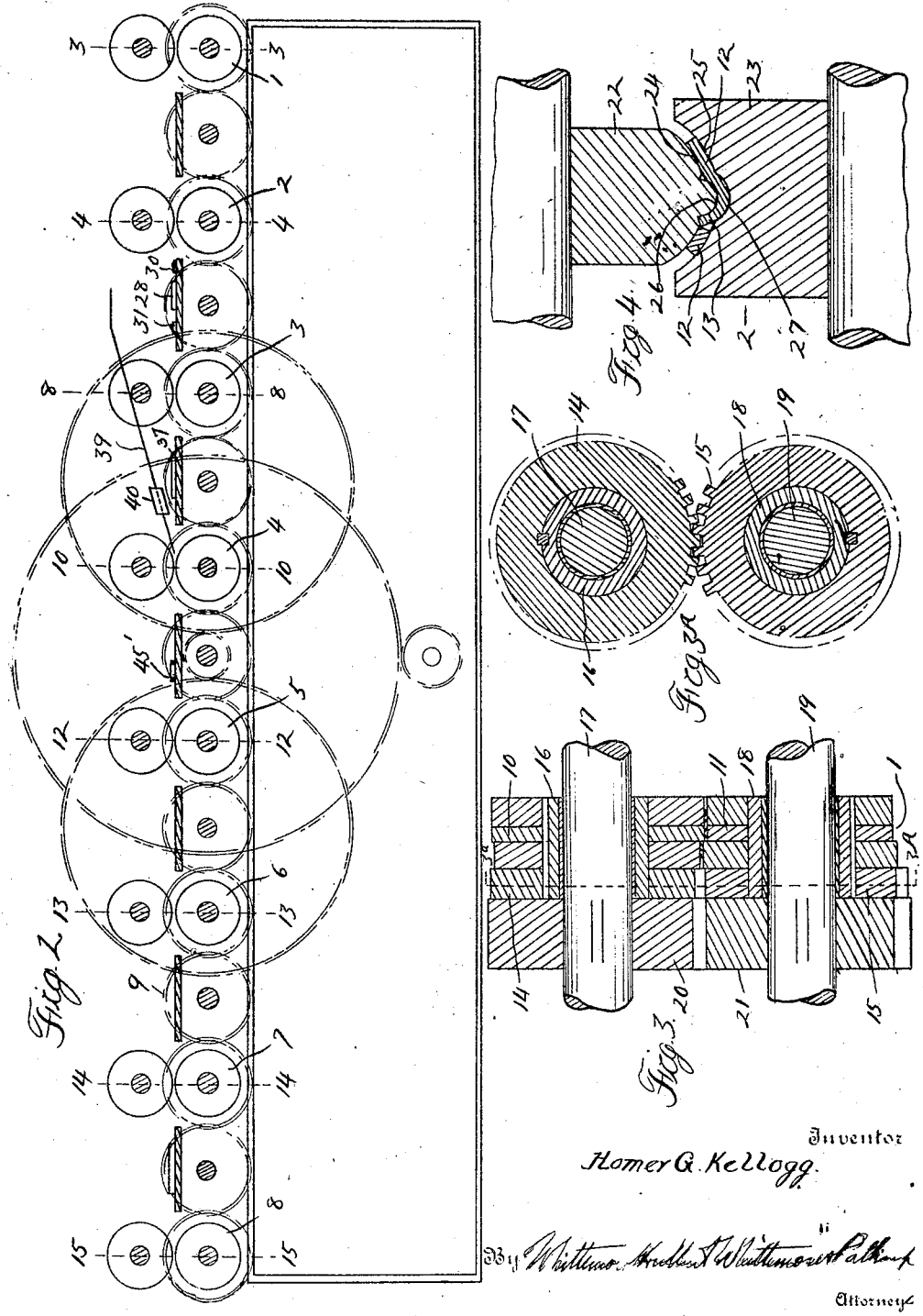

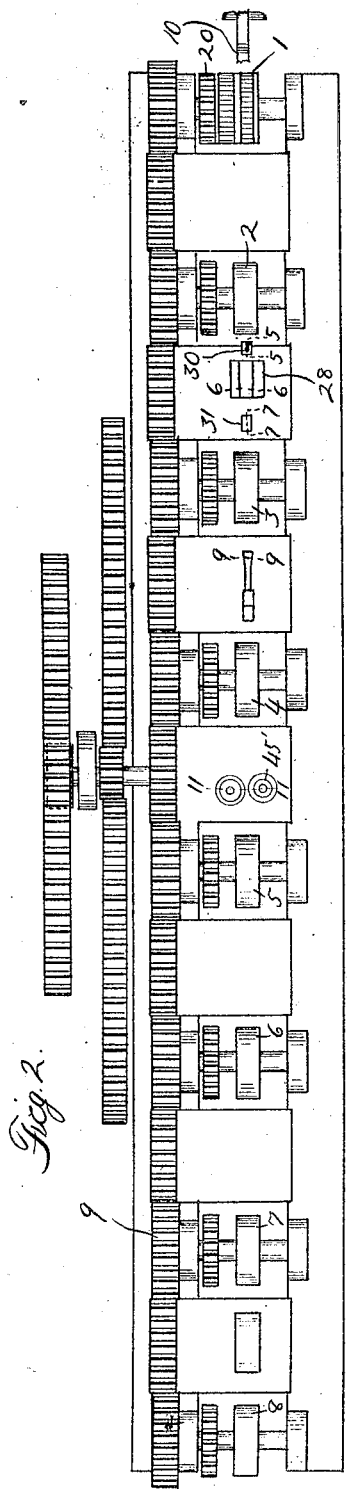

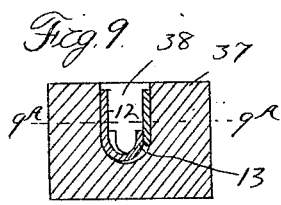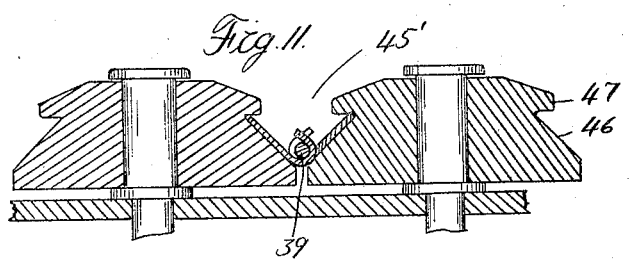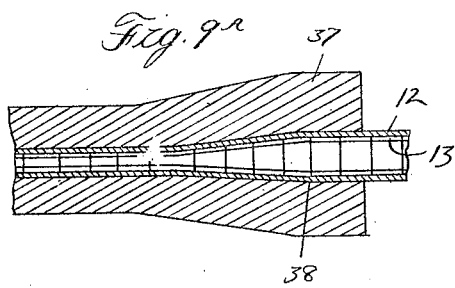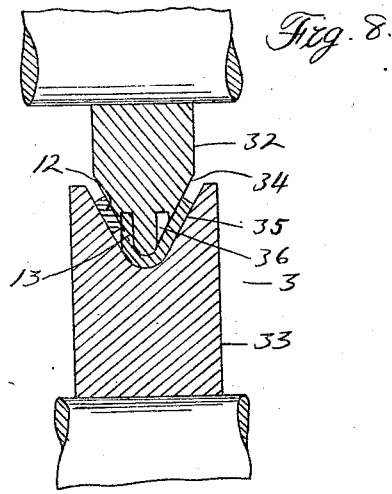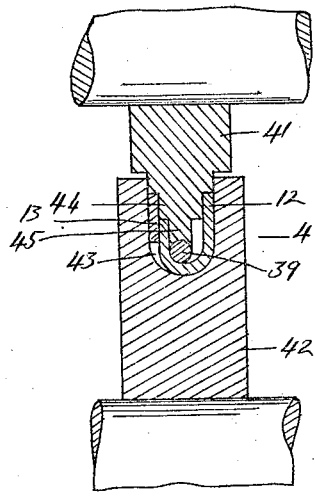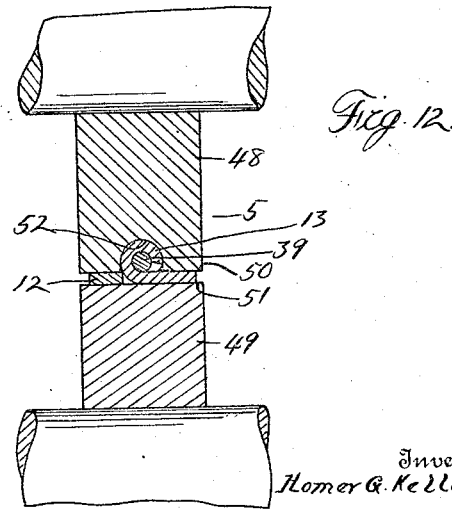

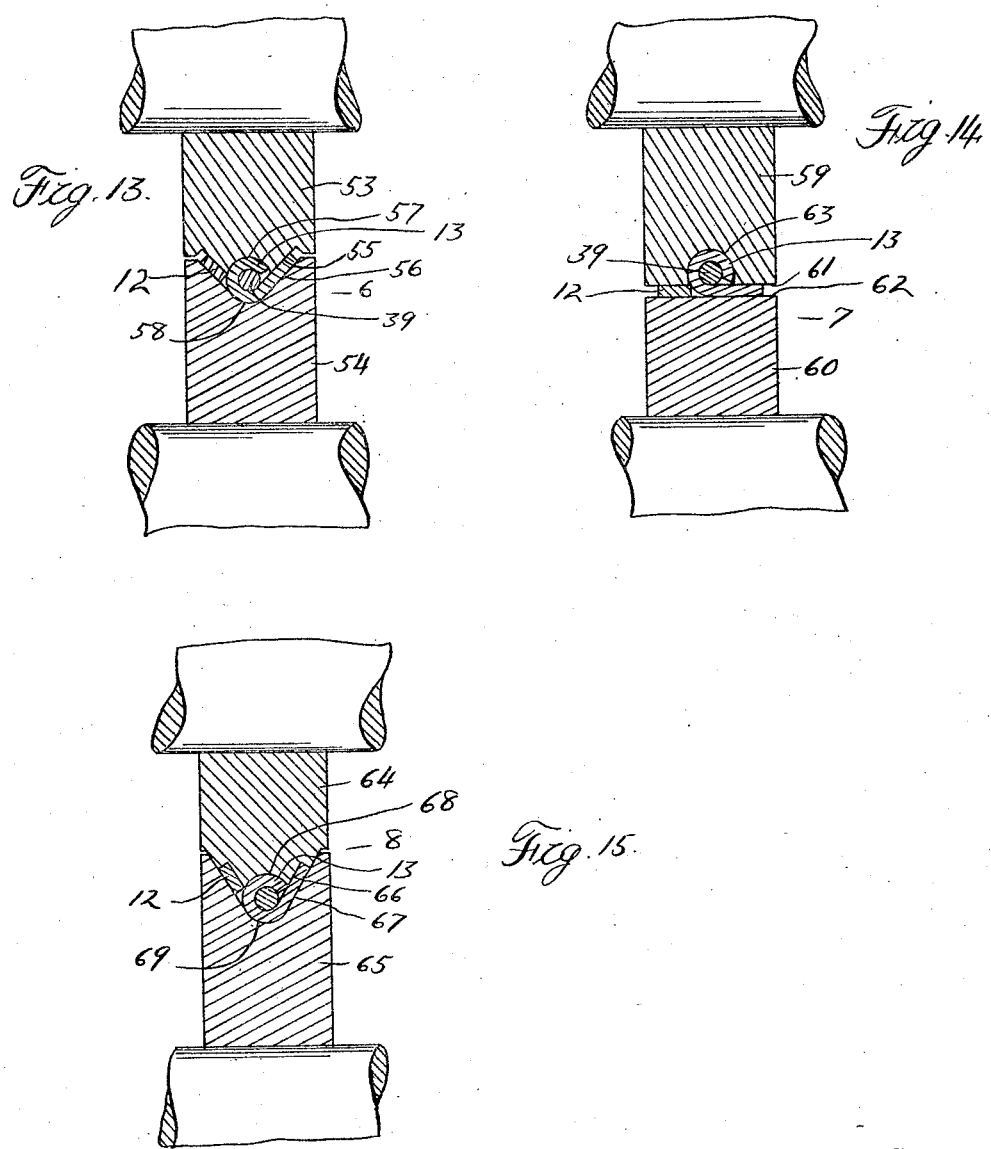

1,604,228

UNITED STATES PATENT OFFICE.

HOMER G. KELLOGG, OF DETROIT, MICHIGAN, ASSIGNOR TO MOTOR PRODUCTS CORPORATION (1923), OF DETROIT, MICHIGAN, A CORPORATION OF NEW YORK.

HINGE-FORMING MACHINE.

Application filed November 13, 1922. Serial No. 600,688.

The invention relates to machines for forming hinges and has for one of its objects the provision of a machine, which, during the advancement of a metallic strip, severs the strip into a plurality of sections and subsequently fashions the sections into hinge members. Another object is to provide a machine which, in addition to forming hinge members, pivotally connects the same to form the completed hinge. A further object is to provide means for accurately positioning the shearing rolls. Other objects of the invention reside in the novel features of construction and combinations and arrangements of parts as more fully hereinafter set forth.

In the drawings:

Figure 1 is a side elevation of a machine embodying my invention;

Figure 2 is a plan view thereof;

Figures 3, 4, 8, 10, 12, 13, 14 and 15 are cross sections respectively on the lines 3—3, 4—4, 8—8, 10—10, 12—12, 13—13, 14—14, and 15 of Figure 1;

Figures 5, 6, 7, 9 and 11 are cross sections respectively on the lines 5—5, 6—6, 7—7, 9—9 and 11—11 of Figure 2;

Figure 3$^A$ is a cross section on the line 3$^A$—3$^A$ of Figure 3;

Figure 6$^A$ is a cross section on the line 6$^A$—6$^A$ of Figure 6;

Figure 9$^A$ is a cross section on the line 9$^A$—9$^A$ of Figure 9.

In general, the hinge forming machine comprises a pair of shearing rolls which shear an advancing metallic strip into two longitudinal sections having the longitudinal series of alternate interengaging tongues, and also comprises a series of pairs of forming rolls which successively operate upon the sections to fashion the tongues into hinge barrels, these tongues being fashioned about an advancing wire.

The machine comprises the pair of shearing rolls 1 and the successive pairs of forming rolls 2, 3, 4, 5, 6, 7 and 8, all of which are driven in timed relation to each other through the series of intermeshing gears 9 extending longitudinally of the machine.

The pair of shearing rolls 1 comprises the upper and lower rolls 10 and 11 which have cooperating shearing edges for operating upon the metallic strip to sever the same into 2 longitudinal sections each comprising the body 12, and the series of longitudinally spaced tongues 13, the tongues of one section alternating with the tongues of the other section and engaging between the same. To maintain both the upper and lower shearing rolls 10 and 11 respectively in accurate position so that they will constantly shear the metallic strip uniformly, they are driven by means of the upper and lower positioning gears 14 and 15 respectively, the interdental spaces and teeth of which are of the same size, and consequently movement of one positioning gear and its driven shearing roll relative to the other positioning gear and its driven shearing roll is prevented. The upper shearing roll 10 and the upper positioning gear 14 are keyed upon the bushing 16 rotatably mounted upon the upper shaft 17, while the lower shearing roll 11 and lower positioning gear 15 are keyed upon the bushing 18 rotatably mounted upon the lower shaft 19. The positioning gears are frictionally driven from the upper and lower driving gears 20 and 21 respectively of the series of driving gears 9, the upper driving gear 20 being keyed upon the shaft 17 and the lower driving gear being keyed upon the shaft 19.

The first pair of forming rolls 2 comprises the upper and lower rolls 22 and 23 which as shown particularly in Figure 4 have the cooperating tapered surfaces 24 and 25 respectively for engaging the bodies 12 of the sheared sections and inclining the same slightly upward. The upper forming roll has the centrally located peripheral bead 26 which cooperates with the centrally located peripheral groove 27 in the lower forming roll to crimp the tongues 13 of the sections and deflect their outer ends upwardly above the upper faces of the bodies.

After passing through the first pair of forming rolls 2, the sheared sections are moved laterally toward each other to bring the tongues of one section into over-lapping relation with the body of the other section. This is accomplished by passing the sections through the die 28, shown particularly in Figures 6 and 6$^A$, which has a rearwardly tapering guideway 29 for receiving the sections and gradually moving the same toward each other as they pass therethrough. To permit of more readily moving the sections laterally toward each other, they are prior to their passage through the die 28, passed over the pair of balls 30 which come into contact with the tongues of the sections and slightly deflect the same upwardly to slightly separate their side edges. Also, after passing through the die 28, the sections are passed over the rounded bearing 31 and bent slightly downward to slightly separate the side edges of the tongues, this being for the purpose of preventing any binding action between the tongues.

The second pair of forming rolls 3 is adapted to receive the sections after having been laterally moved toward each other, and as shown particularly in Figure 8, comprises the upper and lower rolls 32 and 33 respectively which have cooperating tapered bearing surfaces 34 and 35 for engaging the bodies 12 of the sections and inclining the same upwardly. The body of one section engages the tongues of the other section during its upward bending movement, and as a consequence, bends these tongues upwardly also, the upper roll 34 having peripheral grooves 36 on opposite sides of its median plane for receiving these tongues. The tongues are further bent relative to their respective bodies by passing the sections through the die 37 having a U-shaped recess 38 therein with substantially parallel vertical side walls and a round lower end.

As shown in Figure 9A, the width of the recess decreases toward its rear end so that the die in addition to bending the sections into substantially U-shape, move the sections laterally toward each other to bring the tongues of one section to more of an overlapping relation relative to the body of the other section.

The wire 39, around which the tongues 13 of the sheared sections are bent, is fed into the machine and between the tongues after the sections have passed through the die 37. This wire, prior to its engagement with the tongues of the sections, passes through the straightener 40. As shown particularly in Figure 10, the pair of rolls 4 for receiving the wire and also the sections after passing through the die 37, comprises the upper and lower rolls 41 and 42 respectively, the lower roll having a centrally located U-shaped peripheral groove 43 and the upper roll having a centrally located peripheral projection 44 adapted to fit within the recess of the lower roll and having the outer reduced portion 45 providing clearance at its sides for the tongues of the section and adapted to peripherally engage the wire to hold the latter against the bases of the tongues.

The tongues of the sections are then fashioned around the wire, and the first step in fashioning these tongues around the wire comprises the passing of the sections with the wire through the pair of idler forming rolls 45′ shown particularly in Figure 11. These rolls are rotatably mounted upon vertical pivots and have the tapering portions 46 and the annular flange portions 47 extending laterally out over the upper ends of the tapering portions and adapted to abut the outer edges of the bodies of the sections. The arrangement is such that the sections upon passing through these idler forming rolls are swung downwardly with respect to each other as well as moved laterally toward each other, thereby moving the tongues of the sections around the wire so that they cooperate to surround the wire.

The next step in the fashioning of the tongues of the sections around the wire comprises the passing of the sections with the wire through the fourth pair of forming rolls 5, which as shown in Figure 12, comprises the upper and lower rolls 48 and 49 respectively, having cooperating cylindrical surfaces 50 and 51 respectively for engaging the bodies of the sections and swinging the same downwardly into the same plane. The upper roll 48 also has the peripheral centrally located groove 52 for engaging the tongues of the sections and bending the same around the wire. After passing through the pair of forming rolls 5, the partially fashioned sections and the wire then pass through the fifth set of forming rolls 6 which comprises the upper and lower rolls 53 and 54 respectively having cooperating inclined surfaces 55 and 56 respectively for engaging the bodies of the sections and again inclining the same upwardly. The upper and lower rolls also have the centrally located peripheral rounded grooves 57 and 58 respectively which cooperate in engaging the tongues of the sections and particularly bending their bases around the wire so that their ends more nearly engage the respective bodies. After passing through the pair of forming rolls 6, the sections and wire pass through the sixth set of forming rolls 7 comprising the upper and lower rolls 59 and 60 having cooperating cylindrical surfaces 61 and 62 respectively, engageable with the bodies of the sections to incline the same downwardly into the same plane. The upper roll 59 also has the centrally located peripheral rounded groove 63 for engaging the rounded tongues of the sections and assisting in bending the same more completely around the wire. The seventh pair of forming rolls 8 then engage the sections and comprises the upper and lower rolls 64 and 65 respectively having the cooperating inclined surfaces 66 and 67 respectively for again inclining the bodies of the sections upwardly. The rolls also have the centrally located peripheral rounded grooves 68 and 69 for engaging the tongues of the sections and finishing the fashioning thereof around the wire.

The purpose of rotating the bodies of the sections alternately upwardly and downwardly, is to facilitate the fashioning of the tongues around the wire and also to eliminate raw edges upon the sections as well as prevent binding action thereof.

With the above arrangement, the shearing rolls operate upon the metallic strip to draw the same into the machine and to advance the same to the first pair of forming rolls, but after the sheared sections have come into engagement with the first pair of forming rolls, the latter act to advance the sections and strip whereby the shearing rolls are no longer driven, but are rotated through the forming rolls by means of the sheared sections of the strip. Also with this arrangement, the metallic strip is continuously advanced.

From the above description it will be readily seen that I have provided a simple construction of machine which will rapidly form a hinge from a metallic strip by first shearing the strip into two sections having interengaging tongues and subsequently fashioning the tongues around the wire to pivotally connect the sections to each other.

What I claim as my invention is:

1. In a hinge forming machine, the combination with means for severing a strip during its advancement into a plurality of sections, of means for subsequently fashioning the sections during the advancement of the strip into hinge members.

2. In a hinge forming machine, the combination with means for severing a strip during its advancement into a plurality of sections having longitudinally spaced tongues, of means for subsequently fashioning the tongues during the advancement of the strip into barrels to form the sections into hinge members.

3. In a hinge forming machine, the combination with means for severing a strip during its advancement into a plurality of sections, of means for subsequently fashioning the sections around a wire during the advancement of the strip and the wire.

4. In a hinge forming machine, the combination with means for severing a strip during its advancement into a plurality of sections having longitudinally spaced tongues, of means for subsequently fashioning the tongues around a wire during the advancement of the strip and the wire to form cooperating hinge members pivotally connected to each other.

5. In a hinge forming machine, the combination with means for severing a strip during its advancement into a plurality of sections, of means for subsequently fashioning and pivotally connecting the sections during the advancement of the strip into hinge members.

6. In a hinge forming machine, the combination of means for continuously advancing a metallic strip including means for forming cooperating hinge members from the strip, and means for pivotally connecting the hinge members during the advancement of the strip.

7. In a hinge forming machine, the combination with means for shearing an advancing strip into a plurality of sections, of means operating upon the sections during the advancement of the strip to pivotally connect the sections.

8. In a hinge forming machine, the combination with means for shearing a metallic strip into a plurality of sections, of means for advancing and fashioning the sections into hinge members during the advancement.

9. In a hinge forming machine, the combination with rolls for shearing a metallic strip into a plurality of sections, of forming rolls for subsequently operating upon the sections to form hinge members thereof.

10. In a hinge forming machine, the combination with rolls for shearing a metallic strip into a pair of sections, of forming rolls for subsequently fashioning the sections into hinge members and feeding a wire in predetermined relation to the sections, said forming rolls fashioning the sections around the wire.

11. In a hinge forming machine, the combination with means for severing a continuously advancing strip into a pair of sections having alternate interengaging tongues extending longitudinally thereof, of means operating upon said sections for bringing the same into overlapping relation, and means for subsequently fashioning the tongues into hinge barrels during the advancement of the sections.

12. In a hinge forming machine, the combination with means for severing a strip during its continuous advancement into sections, of means for subsequently fashioning the sections during the continuous advancement of the strip into hinge members.

13. In a hinge forming machine, the combination with means for shearing a strip during the continuous advancement thereof into a pair of sections having alternate interengaging tongues extending longitudinally thereof, of means for continuously feeding a wire into predetermined relation to the sections and for fashioning the tongues of the sections into hinge barrels during the continuous advancement of the strip.

14. In a hinge forming machine, the combination with means for severing a strip into a pair of sections having alternate interengaging tongues extending longitudinally thereof, of means operating upon the sections to deflect the outer ends of the tongues of one section outwardly beyond the plane of the body of the other section, means for laterally moving said sections toward each other, and means for subsequently fashioning the tongues into hinge barrels.

15. In a hinge forming machine, the combination with means for severing and advancing a strip into a pair of sections having alternate interengaging tongues extending longitudinally thereof, of means subsequently operating upon said sections during the advancement of the strip for deflecting the outer ends of the tongues of one section beyond the plane of the body of the other section, means for laterally moving said sections toward each other to bring the tongues of one section into overlapping relation with the body of the other section, means for fashioning said sections to bring their tongues into substantially parallel relation to their respective bodies, and means for feeding a wire between the tongues of said section and for fashioning the tongues to surround the wire.

16. In a hinge forming machine, the combination with a pair of parallel shafts, of intermeshing driving gears thereon, cooperating shearing rolls rotatably mounted thereon and intermeshing positioning gears rotatably mounted thereon and connected to said shearing rolls, said positioning gears being frictionally driven from said shafts.

17. In a hinge forming machine, the combination with a pair of parallel driving shafts, of intermeshing driving gears secured thereto, cooperating shearing rolls rotatably mounted thereon, and intermeshing positioning gears connected to said shearing rolls to positively drive the same, said positioning gears having their interdental spaces and teeth of the same size and being driven through said driving gears.

In testimony whereof I affix my signature.

H. G. KELLOGG.